United States Patent [19]
Roberts et al.

[11] Patent Number: 6,031,419
[45] Date of Patent: Feb. 29, 2000

[54] DEMODULATOR FOR CONTACTLESS CHIP CARD

[75] Inventors: Andrews James Roberts, Aix en Provence; Frederic Subbiotto, Fuveau, both of France

[73] Assignee: STMicroelectronics S.A., Gentilly, France

[21] Appl. No.: 09/157,070

[22] Filed: Sep. 18, 1998

[30] Foreign Application Priority Data

Sep. 23, 1997 [FR] France ................................. 97 11788

[51] Int. Cl.⁷ ...................................................... H03D 1/10
[52] U.S. Cl. .......................... 329/349; 329/366; 329/370; 235/380; 235/439
[58] Field of Search ...................... 329/349, 363, 329/364, 366, 369, 370; 235/380, 439

[56] References Cited

U.S. PATENT DOCUMENTS

| 4,782,308 | 11/1988 | Trobec et al. ............................. 331/65 |
| 4,924,171 | 5/1990 | Baba et al. ................................. 323/347 |

FOREIGN PATENT DOCUMENTS

| 0 461 878 A2 | 12/1991 | European Pat. Off. . |
| 0 466 949 A1 | 1/1992 | European Pat. Off. . |
| 0 722 094 A1 | 7/1996 | European Pat. Off. . |
| 0 781 011 A1 | 6/1997 | European Pat. Off. . |

OTHER PUBLICATIONS

Patent Abstracts of Japan, vol. 006, No. 037, Mar. 6, 1982 and JP 56 154858 A, Nov. 30, 1981.
Patent Abstracts of Japan, vol. 017, No. 505, Sep. 10, 1993 and JP 05 128319 A, May 25, 1993.
R.W. Uhlhorn et al., "Evolution of a 100 Mbps Fiber Optic Serial Data Bus for Aereospace Applications," Proceedings of the IEEE 1984 National Aerospace and Electronics Conference, May 1984, vol. 1, pp. 127–134.

*Primary Examiner*—Seigfried H. Grimm
*Attorney, Agent, or Firm*—Theodore E. Galanthan; Allen, Dyer, Doppelt, Milbrath & Gilchrist, P.A.

[57] ABSTRACT

A contactless chip card, receiving binary data transmitted by radio frequency, includes a demodulator for the binary data. The demodulator includes a circuit for the detection of the transmitted signals, a rectifier circuit, a bandpass filter, two comparators and a memory circuit. The bandpass filter provides a low-frequency signal used as a reference for the two comparators and a high-frequency signal that is compared with the references varying with the low frequency signal. As a result, the demodulation is independent of the mean level of the received signal.

28 Claims, 1 Drawing Sheet

DEMODULATOR FOR CONTACTLESS CHIP CARD

FIELD OF THE INVENTION

The invention relates to contactless chip cards in which the transmission of binary data between the user apparatus and the card is done at radio frequency and, more particularly in such cards, it pertains to the demodulation circuit used to detect data in the signals received from the user apparatus.

BACKGROUND OF THE INVENTION

In contactless chip cards, there are known ways of transmitting binary data from the user device to the card by means of a signal at a carrier frequency of 13.56 MHz, for example, that is amplitude modulated by the binary digits of the code to be transmitted. The amplitude-modulated signals have, for example, the shape shown in the graph of FIG. 2a in which the difference between a digit 1 (reference 90) and a digit 0 (reference 92) appears in the amplitude variation.

This amplitude variation of the signal received by the card would be easy to detect by means of a fixed threshold if the received signals were to have the same mean level over the course of time. However, this is not since the level especially varies as a function of the distance between the card and the user apparatus. This distance may vary, for example, when the card is being handled for insertion into and removal from the user apparatus. This level may thus vary from one apparatus to another or from one card to another.

SUMMARY OF THE INVENTION

An object of the present invention, therefore, is to provide a demodulator for a contactless chip card that is insensitive to the level of the signal received.

This object is achieved by making the threshold for the detection of the binary digits vary as a function of the mean level of the signal received. According to the invention, there is provided a demodulator of binary data for a contactless chip card with transmission by radio frequency signals. The demodulator preferably comprises a circuit for the detection of the transmitted signal that generates a signal $V_{AC}$, and a circuit for the rectification of the detected signal $V_{AC}$ that generates a rectified signal $V_{DC}$. The demodulator also includes a bandpass filter to which the rectified signal $V_{DC}$ is applied, this bandpass filter generating two signals, one signal $V_{REF}$ at low frequency and the other signal $V_{FB}$ at high frequency. A comparator stage has the signals $V_{REF}$ and $V_{FB}$ applied thereto for comparison with each other. The demodulator also includes a memory circuit to register the result of the comparison performed by the comparator stage.

BRIEF DESCRIPTION OF THE DRAWINGS

Other features and advantages of the present invention shall appear from the following description of a particular embodiment, the description being made with reference to the appended drawing wherein.

DETAILED DESCRIPTION OF THE PREFERRED EMBODIMENTS

Figure 1:
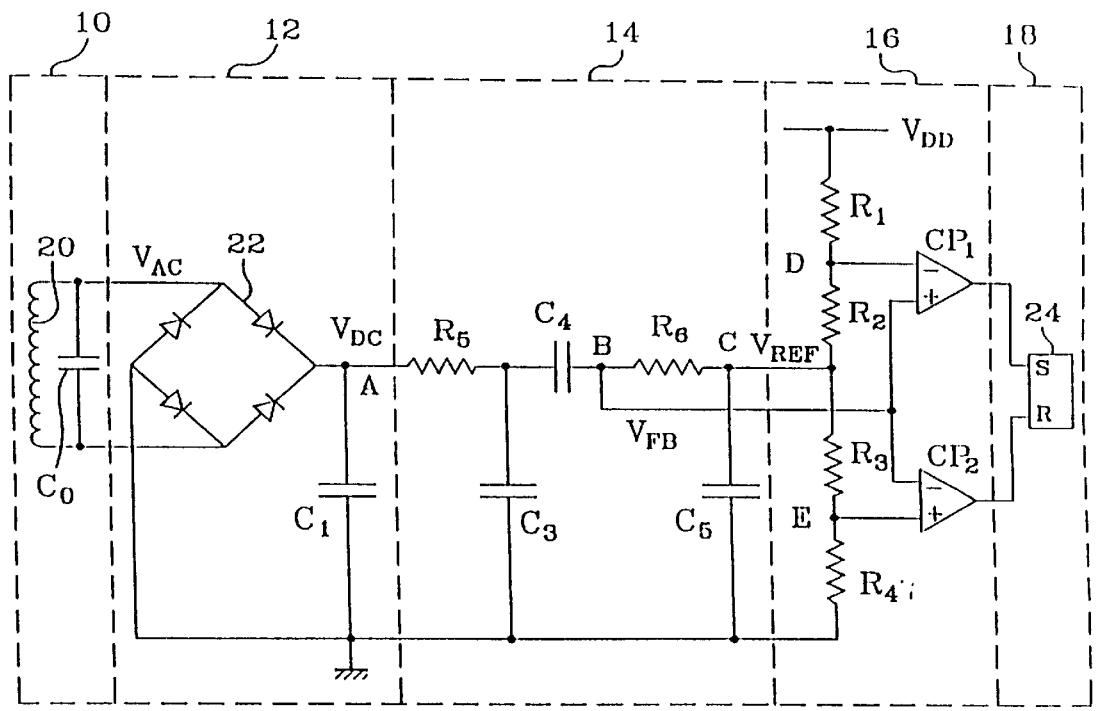
FIG. 1 is an electrical diagram of a demodulator for a contactless chip card according to the invention.

The demodulator for contactless chip cards with transmission by a radio frequency carrier comprises a detection circuit 10 to detect the signal transmitted by the user apparatus, this circuit 10 giving a signal $V_{AC}$. A rectifier circuit 12 is provided to rectify the detected signal $V_{AC}$, this circuit 12 giving a rectified signal $V_{DC}$.

The demodulator also includes a bandpass filter 14 to which the rectified signal $V_{DC}$ is applied, this bandpass filter gives two signals, one signal $V_{REF}$ at low frequency and the other signal $V_{FB}$ at high frequency. The demodulator further includes a comparator stage 16 to which the signals $V_{REF}$ and $V_{FB}$ are applied for comparison with each another, and a memory circuit 18 to record the result of the comparison made by the comparator stage 16.

Figure 2A:
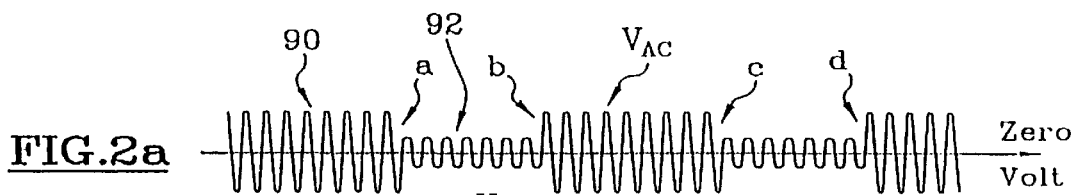
FIGS. 2a to 2d are graphs of signals at certain points of the diagram of the demodulator of FIG. 1.

The detection circuit 10 includes a resonant circuit comprising an antenna loop represented by the turns of a coil 20 and a capacitor $C_0$ that are parallel-connected. This antenna loop is made by several turns housed in the thickness of the chip card (not shown). The detector signal $V_{AC}$ (FIG. 2a) is applied to the rectifier circuit 12 which is provided by a four-diode bridge 22 for full-wave rectification and a capacitor $C_1$.

The rectified signal $V_{DC}$ (FIG. 2b) at the terminals of the capacitor $C_1$ is applied to the bandpass filter 14 which, in a schematic representation, comprises a high-pass filter and a low-pass filter. The high-pass filter includes, in a schematic representation, a resistor $R_5$ and capacitors $C_3$ and $C_4$. One terminal of the resistor $R_5$ is connected to a common node A between the capacitor $C_1$ and one of the output terminals of the diode bridge 22. The other terminal of the resistor $R_5$ is connected to the common node of the capacitors $C_3$ and $C_4$. The other terminal of the capacitor $C_3$ is connected to the ground, while the other terminal of the capacitor $C_4$ forms the output terminal B for the signal $V_{FB}$.

The cut-off frequency of the high-pass filter must be chosen to let through binary data without this data being attenuated to any notable degree. The low-pass filter is provided, in a schematic representation, by the resistor $R_6$ and the capacitor $C_5$. One terminal of the resistor $R_6$ is connected to the output terminal B, while the other terminal forms the output terminal C of the signal $V_{REF}$. The capacitor $C_5$ has a terminal that is connected at the node C, while the other terminal is connected to the ground. The low-pass filter should be designed to minimize ripple at the carrier frequency and to determine the DC component of the signal.

The comparator stage 16 has two comparators $CP_1$ and $CP_2$, each comprising two input terminals referenced − and +. The node B is connected directly firstly to the + input terminal of the comparator $CP_1$ and secondly to the − input terminal of the capacitor $CP_2$ so that these two input terminals receive the signal $V_{FB}$ in full. The node C is connected, through a resistor-based voltage divider, firstly to the − input terminal of the comparator $CP_1$ and secondly to the + input terminal of the comparator $CP_2$ so that these two input terminals receive a part of the signal $V_{REF}$.

In the case of the comparator $CP_1$, the voltage divider comprises the resistors $R_1$ and $R_2$ series-connected between the node C and the supply voltage $V_{DD}$. It is the signal $V_D$ appearing at the common point D of the resistors $R_1$ and $R_2$ that is applied to the comparator $CP_1$.

In the case of the comparator $CP_2$, the voltage divider comprises the resistors $R_3$ and $R_4$ series-connected between the point C and the ground. It is the signal $V_E$ appearing at the common node of the resistors $R_3$ and $R_4$ that is applied to the comparator $CP_2$. These voltages $V_D$ and $V_E$ are respectively used as references or thresholds for the comparators $CP_1$ and $CP_2$ with respect to the signal $V_{FB}$ with $V_D$ having a value greater than $V_{REF}$ but lower than $V_{DD}$ and $V_E$ having a value lower than $V_{REF}$ but greater than that of the ground.

The memory circuit 18 has a bistable circuit 24 that is placed in the state 1 by a signal applied to its input terminal S and in the state 0 by a signal applied to its input terminal R. The output terminal of the comparator $CP_1$ is connected to the input terminal S while the output terminal of the comparator $CP_2$ is connected to the input terminal R.

Figure 2B:
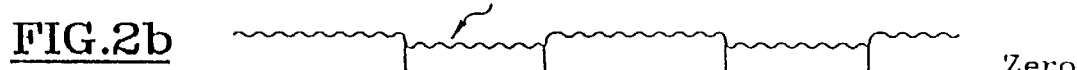
Figure 2C:
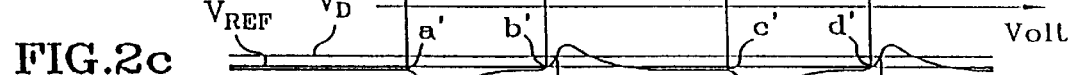

The working of the demodulator according to the invention is then as follows. The high frequency AC signal $V_{AC}$ (FIG. 2a) detected by the circuit 10 is rectified by the circuit 12 to give the signal $V_{DC}$ (FIG. 2b). The signal $V_{DC}$ is filtered in the high-pass filter to give the signal $V_{FB}$ at the point B (FIG. 2c) following the transitions a, b, c, d, of the binary data by variations accentuated at the points a', b', c', d' corresponding to the transitions a, b, c, d of the signal $V_{AC}$.

Figure 2D:
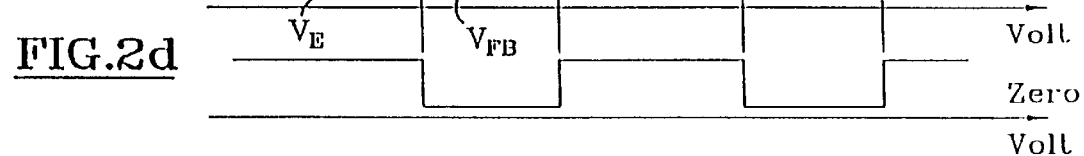

The signal $V_{FB}$ is compared respectively with the thresholds $V_D$ and $V_E$ in the comparators $CP_1$ and $CP_2$ so that the bistable circuit 20 goes to the state 1 when $V_{FB}$ goes above the threshold $V_D$ (b', d') and goes to the state 0 when $V_{FB}$ goes below the threshold $V_E$ (a', c') (FIG. 2d). Since the thresholds $V_D$ and $V_E$ are determined on the basis of the signal $V_{REF}$ at low frequency representing the mean level of the signal received, these thresholds change in the same way as $V_{REF}$, namely as a function of the mean level. The result thereof is that the demodulation is independent of this mean level, which is an object of the invention.

The invention has been described with a demodulator comprising a detection circuit 10 and a rectifier circuit 12 assigned to this demodulator, but it is a fact that the circuits may already exist in the chip card to collect the supply energy and create the supply voltage $V_{DD}$. In this case, the demodulator according to the invention will be connected to the node A which will also be connected to the power supply circuit.

The elements of the demodulator according to the invention are made in the form of a monolithic integrated circuit so that the resistors and the capacitors are formed by transistors according to prior art fabrication techniques. These known fabrication techniques can be easily carried out by those skilled in the art.

The pieces of binary data transmitted have been presented in the form of a modulation known as a "non-return to zero" modulation, but the demodulator of the invention can also be used to demodulate binary data according to other forms of modulation such as bi-phase modulation.

That which is claimed is:

1. A demodulator of binary data for a contactless chip card with transmission by radio frequency signals, said demodulator comprising:
    a detector for receiving a radio frequency signal and generating a detected signal responsive thereto;
    a rectifier for generating a rectified signal based upon the detected signal;
    a bandpass filter for generating a first signal at low frequency and a second signal at high frequency based upon the rectified signal;
    a comparator stage for comparing the first and second signals; and
    a memory for storing a result of a comparing by said comparator stage.

2. A demodulator according to claim 1, wherein said comparator stage comprises first and second comparators.

3. A demodulator according to claim 2, wherein the first comparator has a first input connected to a first threshold greater than the first signal and a second input connected to the second signal; and wherein the second comparator has a first input connected to the second signal and a second input connected to a second threshold lower than the first signal.

4. A demodulator according to claim 3, further comprising a resistor-based voltage divider generating the first and second thresholds.

5. A demodulator according to claim 3, wherein said memory comprises a bistable circuit having a set input terminal connected to an output of said first comparator and having a reset input connected to an output of said second comparator.

6. A demodulator according to claim 1, wherein said bandpass filter comprises:
    a high-pass filter having cut-off frequency for passing the binary data without substantial attenuation; and
    a low-pass filter having a cut-off frequency for reducing ripple at a carrier frequency and for determining a DC component of the rectified signal.

7. A demodulator according to claim 1, wherein said rectifier comprises a four-branch bridge; and wherein each branch comprises a diode.

8. A demodulator according to claim 1, wherein said detector comprises an antenna loop and a capacitor connected in parallel therewith.

9. A contactless chip card comprising:
    a demodulator comprising
        a detector for receiving a radio frequency signal and generating a detected signal responsive thereto;
        a rectifier for generating a rectified signal based upon the detected signal;
        a bandpass filter for generating a first signal at low frequency and a second signal at high frequency based upon the rectified signal;
        a comparator stage for comparing the first and second signals; and
        a memory for storing a result of a comparing by said comparator stage.

10. A chip card according to claim 9, wherein said comparator stage comprises first and second comparators.

11. A chip card according to claim 10, wherein the first comparator has a first input connected to a first threshold greater than the first signal and a second input connected to the second signal; and wherein the second comparator has a first input connected to the second signal and a second input connected to a second threshold lower than the first signal.

12. A chip card according to claim 11, further comprising a resistor-based voltage divider generating the first and second thresholds.

13. A chip card according to claim 11, wherein said memory comprises a bistable circuit having a set input terminal connected to an output of said first comparator and having a reset input connected to an output of said second comparator.

14. A chip card according to claim 9, wherein said bandpass filter comprises:
    a high-pass filter having cut-off frequency for passing the binary data without substantial attenuation; and
    a low-pass filter having a cut-off frequency for reducing ripple at a carrier frequency and for determining a DC component of the rectified signal.

15. A chip card according to claim 9, wherein said rectifier comprises a four-branch bridge; and wherein each branch comprises a diode.

16. A chip card according to claim 9, wherein said detector comprises an antenna loop and a capacitor connected in parallel therewith.

17. A demodulator of binary data for a contactless chip card with transmission by radio frequency signals, said demodulator comprising:

a detector for receiving a radio frequency signal and generating a detected signal responsive thereto;

a rectifier for generating a rectified signal based upon the detected signal;

a bandpass filter for generating a first signal at low frequency and a second signal at high frequency based upon the rectified signal, said bandpass filter comprising a high-pass filter having cut-off frequency for passing the binary data without substantial attenuation, and a low-pass filter having a cut-off frequency for reducing ripple at a carrier frequency and for determining a DC component of the rectified signal; and a comparator stage for comparing the first and second signals.

18. A demodulator according to claim 17, wherein said comparator stage comprises first and second comparators.

19. A demodulator according to claim 18, wherein the first comparator has a first input connected to a first threshold greater than the first signal and a second input connected to the second signal; and wherein the second comparator has a first input connected to the second signal and a second input connected to a second threshold lower than the first signal.

20. A demodulator according to claim 19, further comprising a resistor-based voltage divider generating the first and second thresholds.

21. A demodulator according to claim 18, further comprising a memory for storing a result of a comparing by said comparator stage.

22. A demodulator according to claim 21, wherein said memory comprises a bistable circuit having a set input terminal connected to an output of said first comparator and having a reset input connected to an output of said second comparator.

23. A demodulator according to claim 17, wherein said rectifier comprises a four-branch bridge; and wherein each branch comprises a diode.

24. A demodulator according to claim 17, wherein said detector comprises an antenna loop and a capacitor connected in parallel therewith.

25. A method for demodulating binary data in a contactless chip card receiving transmission by radio frequency signals, the method comprising the steps of:

receiving a radio frequency signal and generating a detected signal responsive thereto;

generating a rectified signal based upon the detected signal;

generating a first signal at low frequency and a second signal at high frequency based upon the rectified signal;

comparing the first and second signals.

26. A method according to claim 25, further comprising the step of storing a result of the comparing step.

27. A method according to claim 26, wherein the step of comparing comprises:

providing a first comparator having a first input connected to a first threshold greater than the first signal and a second input connected to the second signal; and providing a second comparator having a first input connected to the second signal and a second input connected to a second threshold lower than the first signal.

28. A method according to claim 27, further comprising the step of generating the first and second thresholds using a resistor-based voltage divider.

* * * * *